INVENTOR
D. C. FRATE

Jan. 23, 1962  D. C. FRATE  3,017,765
APPARATUS FOR TESTING FRICTIONAL CHARACTERISTICS OF MATERIALS
Filed March 1, 1960  3 Sheets-Sheet 2
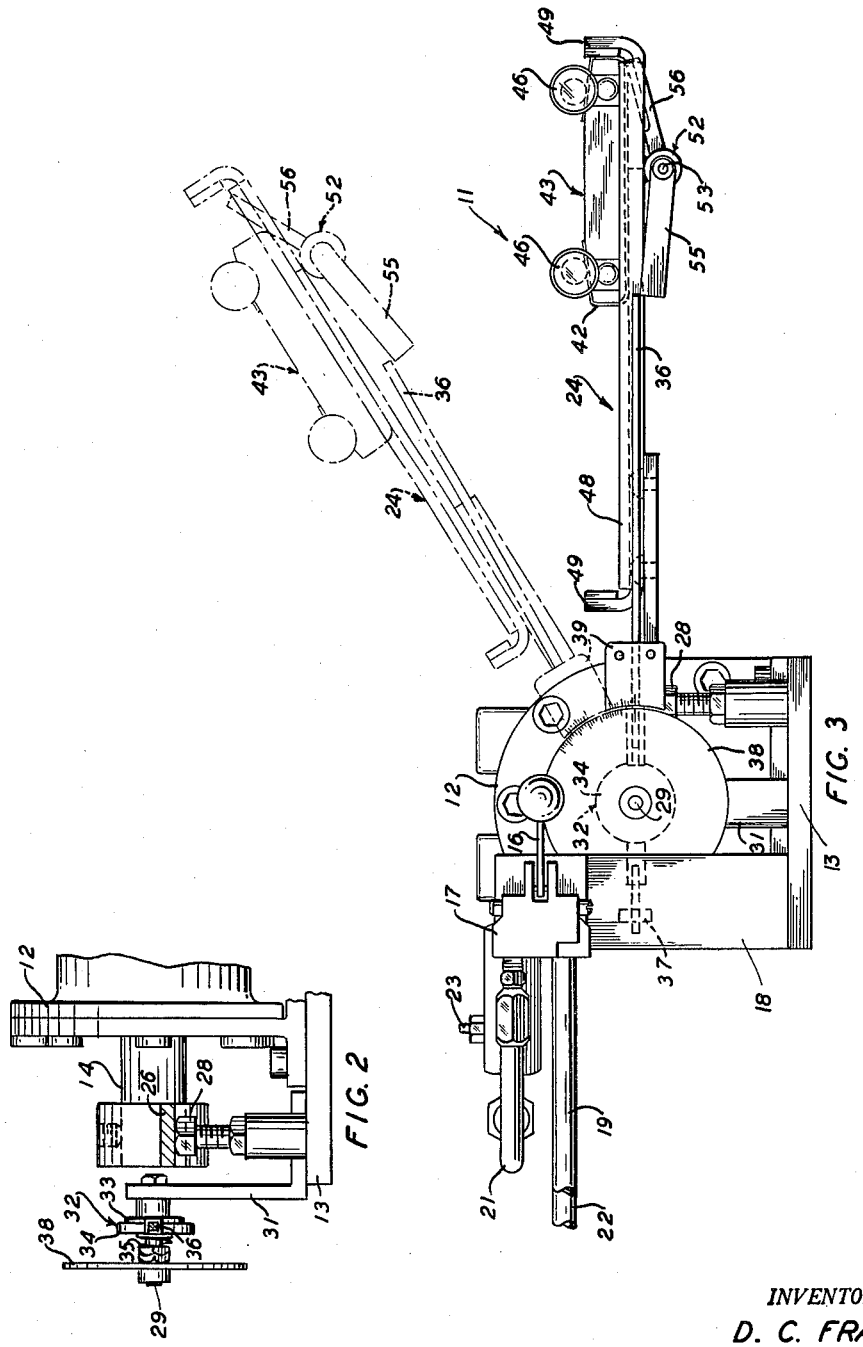
INVENTOR
D. C. FRATE
BY
H. J. Winegar
ATTORNEY Jan. 23, 1962 D. C. FRATE 3,017,765
APPARATUS FOR TESTING FRICTIONAL CHARACTERISTICS OF MATERIALS
Filed March 1, 1960 3 Sheets-Sheet 3

INVENTOR.
D. C. FRATE
BY *H. J. Winegar*
ATTORNEY

United States Patent Office 3,017,765
Patented Jan. 23, 1962

3,017,765
APPARATUS FOR TESTING FRICTIONAL
CHARACTERISTICS OF MATERIALS
Domenico C. Frate, Baltimore, Md., assignor to Western
Electric Company, Incorporated, New York, N.Y., a
corporation of New York
Filed Mar. 1, 1960, Ser. No. 12,165
9 Claims. (Cl. 73—9)

The present invention relates generally to apparatus for testing frictional characteristics of materials and particularly to apparatus for determining the coefficient of static friction of materials.

In the telephone cable making industry, where a core of a cable is covered with a paper tape, it is important to have a grade of paper tape which will possess certain desired qualities. For example, such core covering paper should have a coefficient of static friction below a predetermined value to insure that the paper does not break when the cable is bent or twisted. To determine whether or not a given lot of core paper possesses the desired quality, a sample is subjected to certain tests to determine the characteristics of the paper, including a test of static frictional characteristics to determine the relative smoothness of the sample as compared with a satisfactory sample adopted as a standard.

An object of the invention is to provide new and improved apparatus for testing frictional characteristics of materials.

Another object of the invention is to provide new and improved apparatus for determining coefficient of static friction of materials.

Still another object of the invention is to provide new and improved apparatus for determining coefficient of static friction of a strip of core wrapping paper.

An apparatus for testing frictional characteristics of materials, illustrating certain features of the invention, may include a pivotally mounted table having a substantially planar specimen-supporting surface designed to support a specimen of a material to be tested in sliding contact therewith. Means are provided for pivoting the table about an axis parallel to the specimen-supporting surface through progressively increasing angles of inclination of the specimen-supporting surface with respect to a horizontal reference plane. Also provided are movable indicating means and means normally connecting the indicating means operatively to the table for movement therewith. The displacement of the indicating means is proportional to the angular inclination of the specimen-supporting surface with respect to the horizontal reference plane. The operative connection between the indicating means and the moving table is interrupted by means instantaneously responsive to sliding movement of the specimen relative to the specimen-supporting surface of the table. Means are also provided for resistively retaining the indicating means at the displaced position occupied thereby when sliding movement of the specimen is commenced.

Other objects and features of the invention will be more readily understood from the following detailed description of apparatus forming specific embodiments of the invention, when read in conjunction with the appended drawings, in which:

FIG. 2 is a fragmentary vertical sectional view of the apparatus shown in FIG. 1, as viewed along the line 2—2;

FIG. 3 is a front elevation view of the apparatus shown in FIG. 1;

Figure 1:
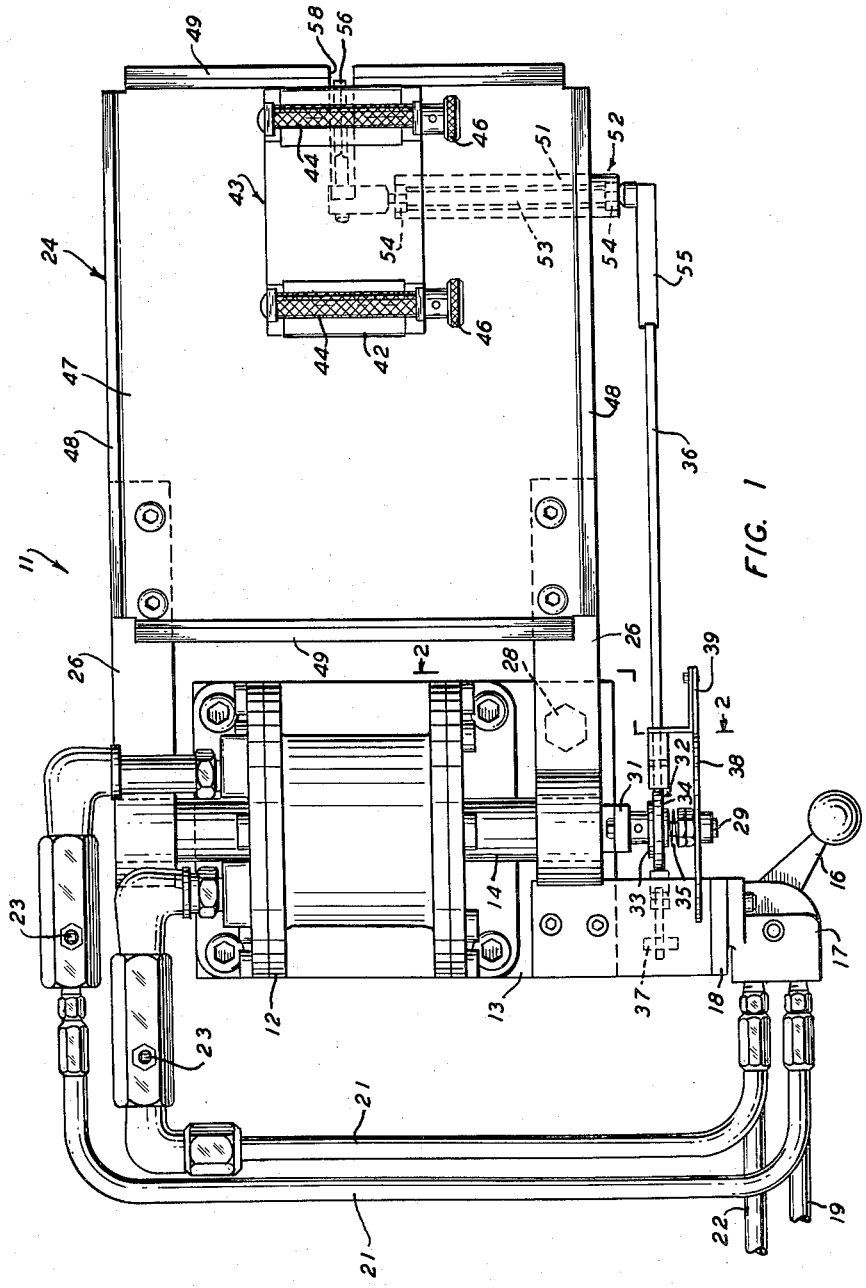
FIG. 1 is a plan view of the apparatus forming a first embodiment of the invention.

Referring to FIGS. 1, 2 and 3, there is illustrated a test apparatus, designated generally by the numeral 11, representing one embodiment of the invention. A fluid-operated, vane-type motor 12, such as a "Hydromotor," manufactured by Hydromotor Products, Division of Ex-Cell-O Corporation, is secured rigidly to a base 13. The motor 12 is operated to rotate an output shaft 14, extending on both sides thereof, selectively in a clockwise or counterclockwise direction by actuating a lever 16 of a fluid control valve 17, which is mounted securely by means of a bracket 18 to the base 13.

The fluid, necessary for operation of the motor 12, is supplied to the valve 17 from a suitable supply means of fluid under pressure (not shown) by means of an inlet line 19. The fluid is then directed selectively from the valve 17 into one of the fluid lines 21—21, depending on whether it is desirable to rotate the output shaft 14 clockwise or counterclockwise. The fluid is exhausted by the motor 12, through the other of the fluid lines 21—21, the valve 17, and an outlet line 22, to the supply means. Adjustable valves 23—23 in the fluid lines 21—21 are used to control the speed of operation of the motor 12.

An elongated table, designated generally by the numeral 24, is connected fixedly at one end thereof by means of brackets 26—26 to the ends of the output shaft 14 for rotation therewith. Counterclockwise rotation of the output shaft 14 as viewed in FIG. 3, and therefore, the counterclockwise motion of the table 24 about its pivotal axis from a horizontal position, as shown in solid lines in FIG. 3, to a position approximately 45° above a horizontal reference plane is limited by internal stops (not shown) which are built within the motor 12. The clockwise rotation of the output shaft 14, and, therefore, the downward motion of the table 24, is limited by an adjustable stop 28.

A stub shaft 29 is mounted coaxially with respect to one end of the output shaft 14 of the motor 12 by means of a bracket 31 mounted to the base 13. A spring-biased friction brake, designated generally by the numeral 32, is mounted to the stub shaft 29 coaxially thereof. One brake member 33 of the brake 32 is rigidly mounted to the stub shaft 29, while the other brake member 34 is loosely mounted on the stub shaft 29 for rotary and slidable axial motion with respect thereto. A bar 36 is mounted at one end thereof to the brake member 34, normally in parallel spaced relationship with the table 24 for pivotable movement with the rotatable member 34 about the pivotal axis of the table 24. A compression spring 35, mounted coaxially with the stub shaft 29, urges adjustably the brake member 34 in contact with the stationary brake member 33 to provide for different degrees of friction between cooperating surfaces of these brake members to retard the pivotable movement of the bar 36 relative to the horizontal reference plane.

The bar 36 is preferably short and made of a lightweight material, such as thin-walled, tubular aluminum stock, so that forces acting on the free portion of the bar due to its weight are negligibly small. A counterweight 37 is adjustably attached diametrically of the bar to the brake member 34 to counterbalance the bar 36 and, therefore, to permit the frictional forces, produced between the cooperating surfaces of the brake members 33 and 34, and required to retain the bar in any desired pivoted position to be relatively small.

A disc-like dial indicator 38 is secured rigidly to the stub shaft 29 coaxially therewith. A vernier scale 39 is mounted to the bar 36 for oscillatable motion therewith, and is positioned along the bar adjacent to the circumference of the dial indicator 38. The dial indicator 38 and the vernier scale 39 are calibrated to indicate the degree of angular displacement of the bar 36 from the horizontal reference plane. The calibration of the dial indicator 38 and the vernier scale 39 may be such as to indicate the angular inclination of the bar 36 with respect to the horizontal reference plane in degrees, or in any arbitrarily selected units.

A test specimen 42, which may be in the form of a flat, flexible, thin strip of a material to be tested, such as a sample strip of core wrapping paper, is secured to a lower surface of a weight block, designated generally by the numeral 43, having predetermined mass. Each end of the test specimen 42 is secured to the block 43 by clamping the ends of the test specimen by means of knurled rollers 44—44 mounted eccentrically on the block. The rollers 44—44 are actuatable manually by means of knurled knobs 46—46 connected rigidly to each of the rollers. The weight block 43 with the test specimen 42 fastened therearound is then positioned slidingly on the upper surface 47 of the table 24 at the free end thereof. The table 24 is provided with side and end portions 48—48 and 49—49, respectively, bent in an upward direction to confine the block 43 thereon.

If a test specimen to be tested is of a more rigid material, a thin plate thereof may be secured by suitable means, e.g. pressure sensitive adhesive, to the underside of the weight block 43. For example, a portion of the weight block 43 may be made removable as a thin plate thereof from the underside of the block to form a cavity therein, which thin plate of the weight block could be selectively attached to or removed from the block depending on whether the block will be used with a pliable strip or rigid material. A thin plate of a rigid test specimen may then be inserted into this cavity in such a manner that only the surface of the test specimen is kept in contact with the table by the weight of the weight block 43. Also, as an alternative, a block of the test specimen made of such rigid material of a predetermined mass may be cut out from the bulk thereof and placed on the table 24.

A tubular bracket 51 of a double-armed escapement mechanism, designated generally by the numeral 52, is secured rigidly to the bottom of the table 24 near the free end thereof. A shaft 53 extends through the tubular bracket 51 and is mounted rotatably in bearings 54—54 at the opposite ends of the tubular bracket. A lever arm 55 of the escapement mechanism 52 is attached fixedly to one end of the shaft 53 in such a manner that the free end of the lever arm 55 is normally in contact with the underside of the free end of the bar 36. A knife-edged lever arm 56, attached fixedly to the other end of the shaft 53, projects into an elongated slot 58 formed in the free end of the table 24. The knife-edge of the lever arm 56 is normally urged by the bar 36, by means of the lever arm 55 and the shaft 53 in contact with the surface of the test specimen 42 wrapped around the weight block 43. The lever arm 55 and the knife-edged lever arm 56 of the escapement mechanism 52 are so constructed that the algebraic sum of moments produced by the lever arm 55 and the knife-edged lever arm 56 equals substantially zero. Therefore, the force exerted by the knife-edged lever arm 56 on the weight block 43 when the lever arm 55 is in contact with the bar 36, will be equal to the frictional force exerted by the brake 32 on the bar and, accordingly, also relatively small.

*Operation*

At the start of a test operation of the apparatus 11, the table 24 is in such a position that the upper surface 47 thereof is, preferably, in a horizontal position. The weight block 43, with the specimen 42 attached thereto in the manner heretofore described, is then placed slidably on the upper surface 47 of the table 24 at the free end thereof overlaying the elongated slot 58.

The upper surface 47 of the table 24 may be made of any suitable material to allow the determination of relative coefficients of friction of the test specimen 42 with respect to the selected surface. The respective angles of inclination of the upper surface 47 of the table 24 with respect to the horizontal reference plane, at which the different specimens start their downward movement, afford a comparative test of static frictional characteristics of different specimens upon different test surfaces.

The table 24 may be pivoted upwardly and counterclockwise preferably from the horizontal position, as shown in FIG. 3. However, other positions of the upper surface 47 of the table 24 intermediate the horizontal position and final positions at which the specimen begins to slide down may be selected to determine the final angle of inclination of the upper surface 47 of the table 24, at which the specimen starts to slide down, and, therefore, the coefficient of static friction of the specimen.

When the block 43, having the test specimen 42 attached thereto, is placed on the upper surface 47 of the table 24 overlying the slot 58, the block pushes on the knife-edged lever arm 56 projecting through the slot 58. At that time the position of the bar 36 is adjusted so that the free end of the other lever arm 55 of the escapement mechanism 52 is in contact with the underside of the free end of the bar. Prior to placing the weight block 43 with the test specimen 42 on the table 24, the friction brake 32 is adjusted to compensate for the weight of the bar 36 so that the bar will not move downwardly merely due to its own weight.

By actuating the lever 16 of the valve 17, the motor 12 is operated, whereupon the output shaft 14 thereof is rotated and the table 24 is pivoted so that the free end of the table is moved in an upward, counterclockwise direction, as shown in FIG. 3. When the free end of the table 24 moves in an upward direction, the lever arm 55 of the escapement mechanism 52, which is in contact with the underside of the free end of the bar 36, moves the free end of the bar so as to pivot the bar about the axis of the stub shaft 29 and, therefore, about the pivotal axis of the table 24 in an upward counterclockwise direction. The vernier scale 39 is moved with the bar adjacent to the dial indicator 38, and, therefore, registers the successive inclinations of upper surface 47 of the table 24 as the table is moved upwardly.

The bar 36 is moved by the lever arm 55 in an upward direction until the gravitational forces on the weight block 43 overcome the frictional forces between the upper surface 47 of the table 24 and the test specimen 42 in contact with the surface thereof, causing the weight block 43 to slide downwardly along the table, as is shown in FIG. 3. The movement of the block 43 with respect to the free end of the table 24 allows the knife-edged lever arm 56, in contact with the weight block 43, to pivot upwardly and counterclockwise through the slot 58 about the axis of rotation of the shaft 53. As a result, the bar 36 and the vernier scale 39 are retained in a position in which they were located at the instant the weight block 43 moved with respect to the table 24. At this time, the operator may read the dial 38 to determine the angle of inclination of the bar with respect to the horizontal reference plane and, therefore, to determine the coefficient of static friction of the surface of the test specimen.

*Alternative embodiment*

Figure 4:
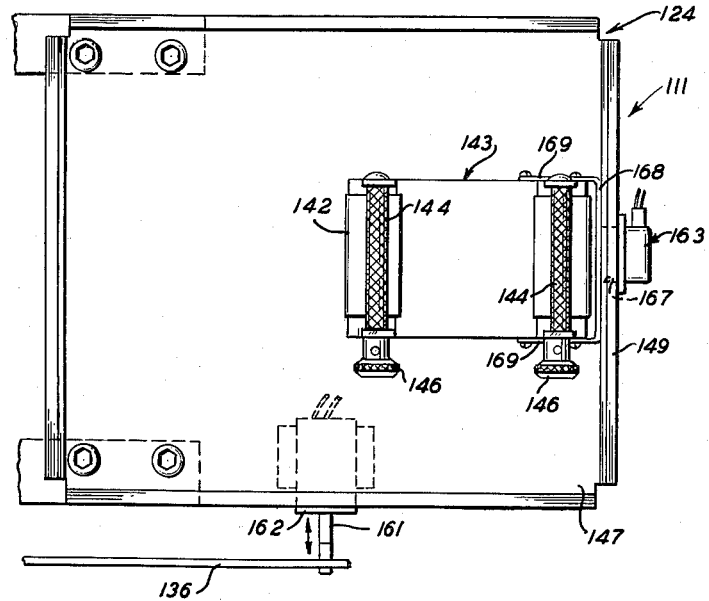
FIG. 4 is a fragmentary, plan view of apparatus forming an alternative embodiment of the apparatus.
Figure 5:
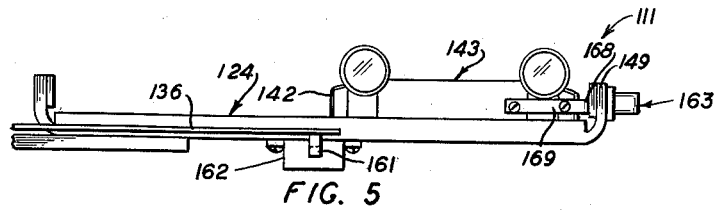
FIG. 5 is a fragmentary, front elevation view of the apparatus shown in FIG. 4.
Figure 6:
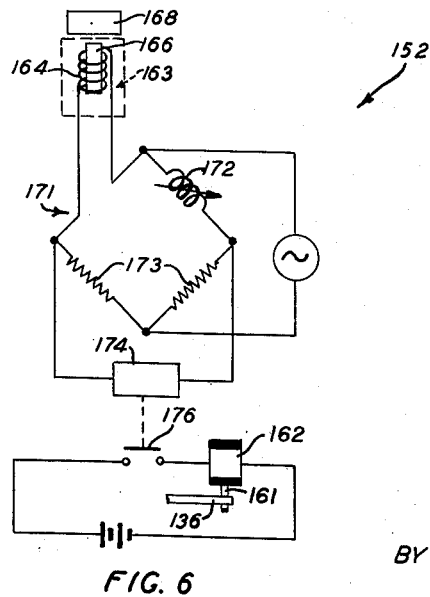
FIG. 6 is a schematic diagram of an electrical circuit forming a part of the apparatus illustrated in FIGS. 4 and 5.

FIGS. 4 to 6, inclusive, disclose an appaartus, designated generally by the numeral 111, which is similar to the apparatus 11, disclosed in FIGS. 1 to 3, inclusive. The modified apparatus 111 includes electrically controlled means for interrupting the operative connection between a table 124 and a bar 136 for registering the angle of inclination of the bar and therefore, of an upper surface 147 of the table with respect to a horizontal reference plane at the instant a weight block 143 carrying a test specimen 142 begins to slide down the upper surface 147 of the table. In this modified apparatus 111, an electro-mechanical escapement mechanism, designated generally by the numeral 152 (FIG. 6), is substituted for the purely mechanical escapement mechanism 52, disclosed in relation with the first embodiment of the invention.

A spring-biased plunger 161 is connected operatively to a quick-action solenoid 162 which is mounted to the underside of the table 124. When the solenoid 162 is de-energized the plunger 161 is urged outwardly of the solenoid into an extended position, as shown in FIGS. 4 to 6, inclusive, and in contact with the underside of the free end of the bar 136. When the table 124 is being pivoted upwardly the plunger 161 moves the free end of the bar 136 and, therefore, the bar is pivoted about the common pivotal axis of both the table and the bar. The instant the weight block 143 carrying the test specimen 142 starts to slide down the inclined upper surface 147 of the table 124, the solenoid 162 is energized whereupon the plunger 161 is withdrawn from contacting the bar 136. Due to frictional forces exerted by a brake 132 on the other end of the bar 136, the bar remains in a position to which the bar was carried by the plunger 161. In such a manner, the angle of inclination of the upper surface 147 of the table 124 with respect to the horizontal reference plane at the instant the test specimen begins to slide and, therefore, the coefficient of the static friction of the test specimen, may be determined conveniently.

The activation of the solenoid 162 may be controlled by means of a circuit shown in FIG. 6. A sensing head, designated generally by the numeral 163, including a coil 164 and a core 166 is mounted to the table 124 and projects inwardly of the table into an aperture 167 in an end portion 149 in the free end of the table. When the weight block 143 is placed on the table adjacent to the aperture 167 so that the weight block abuts the end portion 149 of the table, the sensing head 163 is spaced a predetermined distance from the block.

The sensing head 163 detects the presence or absence of a body of a paramagnetic material in the proximity of the sensing head by changes in the inductance value of the coil 164. The weight block 143 therefore should be made at least in part of a paramagnetic material. For example, the weight block 143, shown in FIGS. 4 and 5, which may be made of any nonparamagnetic material, such as wood or plastic, or of suitable paramagnetic metals, has a plate 168 of paramagnetic material secured thereto by means of brackets 169—169. This arrangement insures that the paramagnetic material of which the plate 168 is made is always spaced a predetermined distance from the sensing head 163 when the plate abuts the end portion 149 of the table 124 having the aperture 167 therein, irrespective of the thickness of the strip of the test specimen 142, and irrespective of whether a strip or a rigid plate of a test specimen is used. The table 124 should also be made of any suitable nonparamagnetic material, such as wood, plastic or aluminum, to prevent any interference with the operation of the sensing head 163 in detecting the movement of the weight block 143 away from the sensing head.

When the weight block 143 carrying the plate 168 is placed slidably on the upper surface 147 at the free end of the table 124 in such a manner that the plate 168 abuts the end portion 149 and is adjacent to the aperture 167, the plate 168 is spaced a predetermined distance from the sensing head 163 which represents one arm of a bridge, designated generally by the numeral 171. At this time a certain inductance value is produced in this arm of the bridge 171, which is then balanced by means of a variable coil 172, representing another arm of the bridge 171, against a standard inductance of a pair of ratio arms 173—173 to balance the inductances of the bridge 171.

When the upper surface 147 of table 124 reaches a certain angle of inclination during the pivotal upward movement thereof, the weight block 143, carrying the test specimen 142, begins to slide downwardly and moves away from the sensing head 163 beyond a certain relatively small predetermined distance from its initial position. Therefore the bridge circuit is unbalanced, whereby an unbalance signal is produced and is then amplified by an amplifier 174, connected to junctions of arms 163 and 172 with arms 173—173, respectively, of the bridge 171. This signal, upon amplification, produces closing of a normally open switch 176 to energize the solenoid 162 whereupon the plunger 161 is withdrawn from contacting the free end of the bar 136. As a result, the bar 136 remains, due to the frictional forces exerted by the brake 132 at the other end thereof, in the same position as it was the instant the weight block 143, and therefore the plate 168, moved away from the sensing head 163.

In place of the sensing head 163 and associated circuitry similar proximity sensing devices may be employed. For example, a proximity limit switch, class 9007, type Q and V, manufactured by the Square D Company, Milwaukee, Wisconsin, and described in their brochure entitled "Control Systems," copyright 1959 may be employed to control the solenoid 162 in the desired manner.

While certain specified embodiments of the invention have been described hereinabove, it will be obvious that various modifications may be made from the specific details described without departing from the spirit and scope of the invention.

What is claimed is:

1. Apparatus for testing frictional characteristics of materials, which comprises a pivotally mounted table having a substantially planar surface designed to support a specimen of a material to be tested in sliding contact therewith, weight means of a predetermined mass for maintaining the specimen in contact with said surface, means for pivoting the table about an axis parallel to said surface through progressively increasing angles of inclination of the surface with respect to a horizontal reference plane, said specimen being normally positioned adjacent one end of the table to be elevated relative to the opposite end of the table, movable indicating means, means responsive to the presence of the specimen in said normal position thereof for normally connecting the indicating means operatively to said table for movement therewith, the displacement of the indicating means, relative to a position thereof corresponding to a position of the table whereat said surface is in parallel relationship with the horizontal reference plane, being proportional to the angular inclination of said surface with respect to the horizontal reference plane, said connecting means being instantaneously responsive to sliding movement of the specimen relative to the surface of the table for discontinuing the operative connection between the indicating means and the moving table, and means for resistively retaining the indicating means at the displaced position occupied thereby when sliding movement of the specimen commenced.

2. Apparatus for testing frictional characteristics of materials, which comprises a pivotally mounted table having a substantially planar surface designed to support a specimen of a material to be tested in sliding contact therewith, weight means of a predetermined mass for maintaining the specimen in contact with said surface, means for pivoting the table about an axis parallel to said surface through progressively increasing angles of inclination of the surface with respect to a horizontal reference plane, said specimen being normally positioned adjacent one end of the table to be elevated relative to the opposite end of the table, a pivotable indicating arm, means responsive to the presence of the specimen in said normal position thereof for normally connecting the indicating arm operatively to said table for pivotable movement therewith, the angular inclination of the indicating arm relative to the horizontal reference plane being proportional to the angular inclination of said surface with respect to the horizontal reference plane, said connecting means being instantaneously responsive to sliding movement of the specimen relative to the surface of the table for discontinuing the operative connection between the indicating arm and the moving table, and means for resistively retaining the indicating arm at the inclined position occupied thereby when sliding movement of the specimen commenced.

3. Apparatus for testing frictional characteristics of materials, which comprises a pivotally mounted table having a substantially planar surface designed to support a specimen of a material to be tested in sliding contact therewith, weight means of a predetermined mass for maintaining the specimen in contact with said surface, means for pivoting the table about an axis parallel to said surface through progressively increasing angles of inclination of the surface with respect to a horizontal reference plane, said specimen being normally positioned adjacent one end of the table to be elevated relative to the opposite end of the table, movable indicating means, an escapement mechanism mounted on the table and responsive to the presence of the specimen in said normal position thereof for normally connecting the indicating means operatively to said table for movement therewith, the displacement of the indicating means, relative to a position thereof corresponding to a position of the table whereat said surface is in parallel relationship with the horizontal reference plane, being proportional to the angular inclination of said surface with respect to the horizontal reference plane, said escapement mechanism being designed for instantaneously discontinuing the operative connection between the indicating means and the moving table in response to sliding movement of the specimen relative to the surface of the table, and means for resistively retaining the indicating means at the displaced position occupied thereby when sliding movement of the specimen commenced.

4. In an apparatus for testing frictional characteristics of materials, including a pivotally mounted table having a substantially planar surface designed to support a specimen of a material to be tested in sliding contact therewith, weight means of a predetermined mass for maintaining the specimen in contact with said surface, and means for pivoting the table about an axis parallel to said surface through progressively increasing angles of inclination of the surface with respect to a horizontal reference plane, said specimen being normally positioned adjacent one end of the table to be elevated relative to the opposite end of the table, the improvement which comprises movable indicating means, lever means mounted freely pivotally to the table for movement therewith, a first portion of said lever means adjacent one free end thereof being normally in contact with the specimen, a second portion of said lever means adjacent the opposite free end thereof being normally connected operatively to the indicating means so as to cause movement of the latter with the table, the displacement of the indicating means, relative to a position thereof corresponding to a position of the table whereat said surface is in parallel relationship with the horizontal reference plane, being proportional to the angular inclination of the planar surface of the table with respect to the horizontal reference plane, said lever means being designed for instantaneously discontinuing the operative connection between the indicating means and the table in response to sliding movement of the specimen relative to the surface of the table, and means for resistively retaining the indicating means in the displaced position occupied thereby when sliding movement of the specimen commenced.

5. In an apparatus for testing frictional characteristics of materials including a pivotally mounted table having a substantially planar surface designed to support a specimen of a material to be tested in sliding contact therewith, weight means of a predetermined mass for maintaining the specimen in contact with said surface, and means for pivoting the table about an axis parallel to said surface through progressively increasing angles of inclination of the surface with respect to a horizontal reference plane, said specimen being normally positioned adjacent one end of the table to be elevated relative to the opposite end of the table, an improvement which comprises movable indicating means, an escapement mechanism pivotally mounted to the table for movement therewith, said escapement mechanism having a pair of lever arms arranged about a common pivotal axis in a rigid relationship to each other, the first of said lever arms being normally in contact with the specimen, while the second of said lever arms normally connecting the indicating means operatively to the table for movement therewith, the displacement of the indicating means, relative to a position thereof corresponding to a position of the table whereat said surface is in parallel relationship with the horizontal reference plane, being proportional to the angular inclination of the planar surface of the table with respect to the horizontal reference plane, said escapement mechanism being designed for instantaneously discontinuing the operative connection between the indicating means and the table in response to the sliding movement of the specimen relative to the surface of the table, and means for resistively retaining the indicating means in the displaced position occupied thereby when sliding movement of the specimen commenced.

6. Apparatus for testing frictional characteristics of materials, which comprises a pivotally mounted table having a substantially planar surface designed to support a specimen of a material to be tested in sliding contact therewith, weight means of a predetermined mass for maintaining the specimen in contact with said surface, means for pivoting the table about an axis parallel to said surface through progressively increasing angles of inclination of the surface with respect to a horizontal reference plane, a pivotable indicating arm, slidable plunger means mounted operably to the table for normally connecting the indicating arm operatively to said table for movement therewith, the angular inclination of the indicating arm relative to the horizontal reference plane being proportional to the angular inclination of said surface with respect to the horizontal reference plane, means instantaneously responsive to sliding movement of the specimen relative to the surface of the table for withdrawing said slidable plunger means from a normal connecting position to discontinue the operative connection between the indicating arm and the moving table, and means for resistively retaining the indicating arm in the inclined position occupied thereby when sliding movement of the specimen commenced.

7. Apparatus for testing frictional characteristics of materials, which comprises a pivotally mounted table, a weight block of a predetermined mass having a specimen of a material to be tested attached to the lower surface thereof, at least portions of said weight block being made of a paramagnetic material, said table having a substantially planar surface designed to support the specimen in sliding contact therewith, means for pivoting the table about an axis parallel to said surface through progressively increasing angles of inclination of the surface with respect to a horizontal reference plane, movable indicating means, slidable plunger means mounted to the table for normally connecting the indicating means operatively to said table for movement therewith, the displacement of the indicating means, relative to a position thereof corresponding to a position of the table whereat said surface is in parallel relationship with the horizontal reference plane, being proportional to the angular inclination of said surface with respect to the horizontal reference plane, proximity sensing means having a sensing head designed for detecting the movement of a paramagnetic body with respect to the sensing head, said weight block being normally located juxtaposed to the sensing head, a solenoid designed when energized for withdrawing the slidable plunger means to discontinue the operative connection between the indicating means and the moving table, said proximity sensing means being designed for energizing the solenoid upon detecting movement of the weight block away from the sensing head and, therefore, the sliding movement of the specimen relative to the surface of the table, and means for resistively retaining the indicating means at the displaced position occupied thereby when sliding movement of the specimen commenced.

8. In an apparatus for testing frictional characteristics of material including a pivotally mounted support having a substantially planar surface designed to support a specimen of a material to be tested in sliding contact therewith, weight means of a predetermined mass for maintaining the specimen in contact with said surface, and means for pivoting the support about an axis parallel to said surface through progressively increasing angles of inclination of the surface with respect to a horizontal reference plane, an improvement which comprises movable indicating means, slidable plunger means connecting the indicating means operatively to said table for movement therewith, the displacement of the indicating means, relative to a position thereof corresponding to a position of the table whereat said surface is in parallel relationship with the horizontal reference plane, being proportional to the angular inclination of said surface with respect to the horizontal reference plane, means instantaneously responsive to sliding movement of the specimen relative to the surface of the table for withdrawing the slidable plunger means to discontinue the operative connection between the indicating means and the moving table, and means for resistively retaining the indicating means in the inclined position occupied thereby when sliding movement of the specimen commenced.

9. In an apparatus for testing frictional characteristics of materials including a pivotally mounted table having a substantially planar surface designed to support a specimen of a material to be tested in sliding contact therewith, weight means of a predetermined mass for maintaining the specimen in contact with said surface, and means for pivoting the support about an axis parallel to said surface through progressively increasing angles of inclination of the surface with respect to a horizontal reference plane, an improvement which comprises a pivotable indicating arm, slidable plunger means connecting the indicating arm operatively to said table for pivotable movement therewith, the angular inclination of the indicating arm with respect to the horizontal reference plane being proportional to the angular inclination of said surface with respect to the horizontal reference plane, means instantaneously responsive to sliding movement of the specimen relative to the surface of the table for withdrawing said slidable plunger means to discontinue the operative connection between the indicating arm and the moving table, and frictional braking means for retaining the indicating arm at the displaced position occupied thereby.

References Cited in the file of this patent
UNITED STATES PATENTS

| | | |
|---|---|---|
| 1,772,415 | Carpenter | Aug. 5, 1930 |
| 2,706,909 | Boor | Apr. 26, 1955 |
| 2,955,455 | Frederick | Oct. 11, 1960 |